United States Patent [19]
Mathers et al.

[11] Patent Number: 5,231,062
[45] Date of Patent: Jul. 27, 1993

[54] TRANSPARENT ALUMINUM OXYNITRIDE-BASED CERAMIC ARTICLE

[75] Inventors: James P. Mathers, Woodbury; Robert G. Frey, White Bear Lake, both of Minn.

[73] Assignee: Minnesota Mining and Manufacturing Company, St. Paul, Minn.

[21] Appl. No.: 565,058

[22] Filed: Aug. 9, 1990

[51] Int. Cl.$^5$ .............................. C04B 35/58
[52] U.S. Cl. ...................... 501/96; 501/98; 501/119; 501/153; 106/35; 433/8
[58] Field of Search ............ 501/96, 98, 153, 119; 106/35; 433/8

[56] References Cited

U.S. PATENT DOCUMENTS

| | | | |
|---|---|---|---|
| 3,026,210 | 3/1962 | Coble | 106/39 |
| 4,241,000 | 12/1980 | McCauley et al. | 264/65 |
| 4,425,141 | 1/1984 | Buljan et al. | 501/98 X |
| 4,426,209 | 1/1984 | Sarin et al. | 501/98 X |
| 4,481,300 | 6/1984 | Hartnett et al. | 501/98 |
| 4,520,116 | 5/1985 | Gentilman et al. | 501/98 |
| 4,686,070 | 8/1987 | Maguire et al. | 264/1.2 |
| 4,720,362 | 1/1988 | Gentilman et al. | 264/1.2 |

FOREIGN PATENT DOCUMENTS

| | | |
|---|---|---|
| 59-46439 | 9/1985 | Japan . |
| 60-191061 | 9/1985 | Japan . |
| 2150129 | 6/1985 | United Kingdom ............ 501/98 |

OTHER PUBLICATIONS

"Phase Relationship in the System Mg-Al-O-N", *Chinese Sci. Bull.*, 35, (14), Jul., 1990, pp. 1189-1192, Sun et al.

"A Simple Model for Aluminum Oxynitride Spinels", *J. Am. Ceram. Soc.*, 61, (708), 1978, pp. 372-373.

"Study on the Reductive Spinel-A New Formula Al-N-Al$_2$O$_3$ Instead of the Previous One Al$_2$O$_4$" *Bull. Chem. Soc. Jap.*, 32, (11); Nov. 1959, pp. 1264-1265.

"On the Formation of High Temperature Nonstoichiometric Spinels and Derivative Phases, In Several Oxide Systems Based on Alumina and in the System Aluminum Nitride Alumina," *Rev., Hautes, Temper. et Refract.*, Ch. 5, 1, 1964, pp. 58-95.

"The System Al-Mg-O-N", *J. Am. Ceram. Soc.*, 65, (5-6), 1982, pp. C-68-69.

*Primary Examiner*—Karl Group
*Attorney, Agent, or Firm*—Gary L. Griswold; Walter N. Kirn; Lorraine R. Sherman

[57] ABSTRACT

This invention provides a transparent aluminum magnesium oxynitride ceramic, wherein greater than 0.5 weight percent of the total ceramic composition is magnesium oxide. The ceramic article of the present invention is useful in applications where it is desirable to have a transparent ceramic including, for example, in orthodontic brackets, ferrules, and gas tight envelopes.

13 Claims, 4 Drawing Sheets

TRANSPARENT ALUMINUM OXYNITRIDE-BASED CERAMIC ARTICLE

FIELD OF THE INVENTION

This invention relates to a transparent ceramic article comprising aluminum magnesium oxynitride. The ceramic article of the present invention is useful in applications where it is desirable to have a transparent ceramic including, for example, dental devices (e.g., orthodontic brackets), ferrules, gas tight envelopes (e.g., high pressure sodium vapor discharge lamps), radomes, and windows for infrared sensors, armor, chemical processing equipment, and high temperature ovens.

BACKGROUND ART

Transparent polycrystalline ceramics are known in the art. There are, however, two significant difficulties in the preparation of optically transparent ceramics: (1) randomly oriented polycrystalline anisotropic ceramics, which inherently have a different refractive index along at least two crystal axes, scatter light at each grain boundary; and (2) ceramics comprising two or more phases having different refractive indices scatter light at each phase boundary. Second phases include pores which may be present in a ceramic. Such pores contain gases which have a refractive index of about 1.0 whereas the refractive index of ceramic is typically significantly greater than 1.0 (e.g., in the range of 1.4 to 2.8).

Polycrystalline aluminum oxide is used as an optically transparent ceramic in certain applications (e.g., high pressure sodium vapor discharge lamps). The optical transparency of polycrystalline alumina, however, is limited because of its anisotropic crystal structure. An alternative to alumina is gamma-aluminum oxynitride. Gamma-aluminum oxynitride, commonly referred to as "AlON", is an $AlN-Al_2O_3$ solid solution. In the early literature this material was sometimes referred to as "nitrogen stabilized cubic $Al_2O_3$." Gamma-aluminum oxynitride is more transparent than alumina because the former has a cubic crystal structure which is inherently isotropic whereas the latter has a non-cubic crystal which is inherently non-isotropic.

Synthesis of aluminum oxynitride was first reported by Yamaguchi et. al. in "Study on the Reductive Spinel—A new Spinel Formula $AlN-Al_2O_3$ Instead of the Previous One $Al_3O_4$", *Bull. Chem. Soc. Jap.*, 32, (11), November, 1959, pp. 1264-65, wherein alumina and graphite were reacted above 1650° C. in an unspecified atmosphere. The composition and structure of gamma-aluminum oxynitride were later described in more detail by Lejus in "On the Formation of High Temperature Nonstoichiometric Spinels and Derivative Phases, In Several Systems Based on Alumina and In The System Aluminum Nitride-Alumina", *Temper. et Refract.*, Ch. 5, 1, 1964, pp. 58-95. Lejus's preparation on aluminum oxynitride included reacting aluminum nitride and alumina.

U.S. Pat. No. 4,241,000 discloses a structural ceramic material comprising sintered single phase, polycrystalline, cubic aluminum oxynitride which displays isotropic optical, thermal, and electrical properties, an infrared cutoff of about 5.2 micrometers, and which shows no chemical or physical property change after heating to 1100° C. in an air atmosphere. The aluminum oxynitride ceramic was prepared by isostatically pressing a mixture of aluminum nitride and alumina powders, heating in nitrogen for 24 hours at 1200° C., and then sintering in nitrogen at 1975° C. for 1 hour.

Use of sintering aids, such as boron, yttrium, lanthanum compounds, or combinations thereof, to improve the optical transparency of sintered AlON is disclosed in U.S. Pat. Nos. 4,481,300, 4,520,116, 4,686,070, and 4,720,362 and in unexamined Japanese Pat. No. SHO60-191061. The latter also describes an improvement in optical transparency by using aluminum nitride powder with a mean particle size diameter of less than 2 micrometers.

Weiss et. al. in "The System Al-Mg-O-N", *J. Am. Ceram. Soc.*, 65, (5-6), 1982, pp. C-68-69, reported that although an understanding of the phase relations and compositions of the Al-Mg-O-N system is still incomplete, gamma aluminum magnesium oxynitride may be described by the formula,

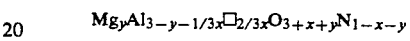

wherein the temperature-dependent solubility limits are $0 \leq x \leq 1$; $0 \leq y \leq 1$; and $x+y=1$. The authors did not disclose or suggest a transparent gamma-aluminum magnesium oxynitride, nor did they disclose or suggest a possible use for this ceramic material.

U.S. Pat. No. 3,026,210 discloses the use of up to 0.5 weight percent MgO as a sintering aid in the preparation of a transparent, high density, polycrystalline body of alumina having an in-line transmission of not less than 0.5 percent per millimeter thickness of the body of radiant energy of all wavelengths in the range from about 0.3 to about 6.6 micrometers and having not less than 10 percent at some specific wavelength within the range of about 0.3 to about 6.6 micrometers. The presence of higher amounts of MgO resulted in a reduction in transparency due to the increased formation of a $MgAl_2O_4$ second phase.

SUMMARY OF THE INVENTION

Briefly, the present invention provides a transparent ceramic article consisting essentially of aluminum magnesium oxynitride, wherein greater than 0.5 weight percent of the total aluminum magnesium oxynitride composition is magnesium oxide. Preferably, magnesium oxide comprises 1 to 12 weight percent and aluminum nitride comprises 3 to 24 weight percent of the total aluminum magnesium oxynitride composition. More preferably, MgO comprises 4 to 9 weight percent and AlN comprises 11 to 16 weight percent of the total aluminum magnesium oxynitride composition. The presence of greater than 0.5 weight percent magnesium oxide significantly reduces the sintering time required to provide a transparent aluminum oxynitride-based ceramic.

Preferably, the transparent article according to the present invention is colorless.

Preferably, pores (voids), if present in the ceramic article of the present invention, have a diameter less than 1 micrometer. More preferably, the diameter of the pores is less than 0.3 micrometer.

Preferably, the transparent article of the present invention has greater than 98 percent theoretical density (i.e., has less than 2 volume percent voids, based on the total volume of the transparent article). More preferably, the density is greater than 99.5 percent. Even more preferably, it is greater than 99.8 percent, and most preferably it is 100.0 percent.

The preferred starting materials are in powder form and comprise 44.5 to 85 weight percent $Al_2O_3$, 11 to 16 weight percent AlN, up to 12 weight percent MgO, and up to 42.5 weight percent $MgAl_2O_4$, provided the amount of MgO present as MgO or present in $MgAl_2O_4$ is in the range of 1 to 12 weight percent, based on the total ceramic composition.

Preferably, the ceramic article of the present invention is prepared by mixing $Al_2O_3$ and AlN powders, at least one of MgO and $MgAl_2O_4$ powders, and at least one organic binder, shaping the resulting mixture, heating the green shaped article to a temperature and for a time sufficient to burn out organic substituents, and then further heating the shaped article to a temperature and for a time sufficient to provide a sintered, transparent aluminum magnesium oxynitride-based ceramic.

The oxynitride-based ceramic article of the present invention may be sintered in a hydrogen, a nitrogen, an ammonia, or an inert (e.g., argon, helium, etc.) atmosphere. The preferred sintering atmosphere is nitrogen.

In this application:

"ceramic" means an inorganic nonmetallic material, such as metal oxides, metal nitrides, and metal oxynitrides, consolidated by the action of heat;

"green" refers to an article which is unfired (i.e., not in its final consolidated form);

"sintering" means densification or consolidation of a powder compact during firing;

"sintering aid" means an addition to a powder compact which increases the rate or extent of densification or consolidation during sintering;

"polycrystalline" means a ceramic body comprised of many individual grains which are bonded together;

"grain" means an individual crystal which together with other grains make up a polycrystalline ceramic body;

"crystallite" means a crystal smaller than 10.0 micrometers in size;

"optical density", D, is defined according to the equation $$D = \log \frac{I_o}{I},$$

wherein $I_o$ is the intensity of the incident ray of radiation in the visible range (i.e., having a wavelength in the range of 0.38 to 0.76 micrometer) and I is the intensity of the transmitted ray of radiation;

"transparent" means at least one of the following:

(1) having a percent diffuse transmission value of at least 35%, based on a flat, polished 1.25 mm thick body, wherein percent diffuse transmission T, is related to optical density according to the equation, $$D = \log \frac{1}{T}; \text{ and}$$

(2) having an in-line transmission value of at least 10 percent in the wavelength range of 0.25 up to at least 6 micrometers, based on a flat, polished 1 mm thick body;

"colorless" means substantially free of color, and preferably it means an absence of color (i.e., clear);

"AlON" means an aluminum oxynitride ceramic having a cubic spinel structure wherein the ceramic is an $Al_2O_3$-AlN solid solution (Our own experiments suggest AlON has a composition range given by the formula, $Al_{(2+x)}O_3N_x$, wherein X is in the range of 0.24 to 0.55.);

"AlMgON" means an aluminum magnesium oxynitride a cubic spinel structure wherein the ceramic is an $Al_2O_3$-MgO-AlN solid solution; and "reaction-sintering" means a heat-treatment in which powders react with each other and then sinter to form a dense, consolidated body.

A transparent article comprising aluminum oxide and aluminum magnesium oxynitride and a method to make the same is disclosed in assignee's copending patent application, U.S. Ser. No. 07/565,057, filed the same date as this application, now U.S. Pat. No. 5,096,862.

The art does not disclose or suggest a transparent aluminum magnesium oxynitride ceramic article comprising greater than 0.5 weight percent magnesium oxide.

Useful articles comprising the transparent ceramic of the present invention include, for example, dental devices, ferrules, and gas tight envelopes.

Several embodiments comprising the inventive transparent ceramic may preferably be bonded to a substrate during use. For example, a dental device may be bonded to a tooth, an optical fiber may be bonded to a ferrule, etc.

A preferred method of bonding a transparent ceramic article according to the present invention to a substrate comprises the step of curing a radiation curable resin which is in contact with a surface of a transparent ceramic article according to the present invention and a surface of a substrate, wherein the curable resin is exposed to electromagnetic radiation transmitted through the transparent ceramic article in an amount sufficient to cure the resin.

Preferably, the electromagnetic radiation has at least one wavelength in the range of 0.25 to 6 micrometers. More preferably, the electromagnetic radiation has at least one wavelength in the range of 0.40 to 0.70 micrometer. The preferred radiation curable resin is selected from the group consisting of a UV curable resin (i.e., a resin which can be cured by exposure to electromagnetic radiation having at least one wavelength in the range of 0.25 to 0.40 micrometer), a light curable resin (i.e., a resin which can be cured by exposure to electromagnetic radiation having at least one wavelength in the range of 0.40 to 0.70 micrometer), an IR curable resin (i.e., a resin which can be cured by exposure to electromagnetic radiation having at least one wavelength in the range of 0.70 to 6 micrometers), and a combination thereof. The most preferred radiation curable resin is a light curable resin.

DETAILED DESCRIPTION OF PREFERRED EMBODIMENTS

Figure 1:
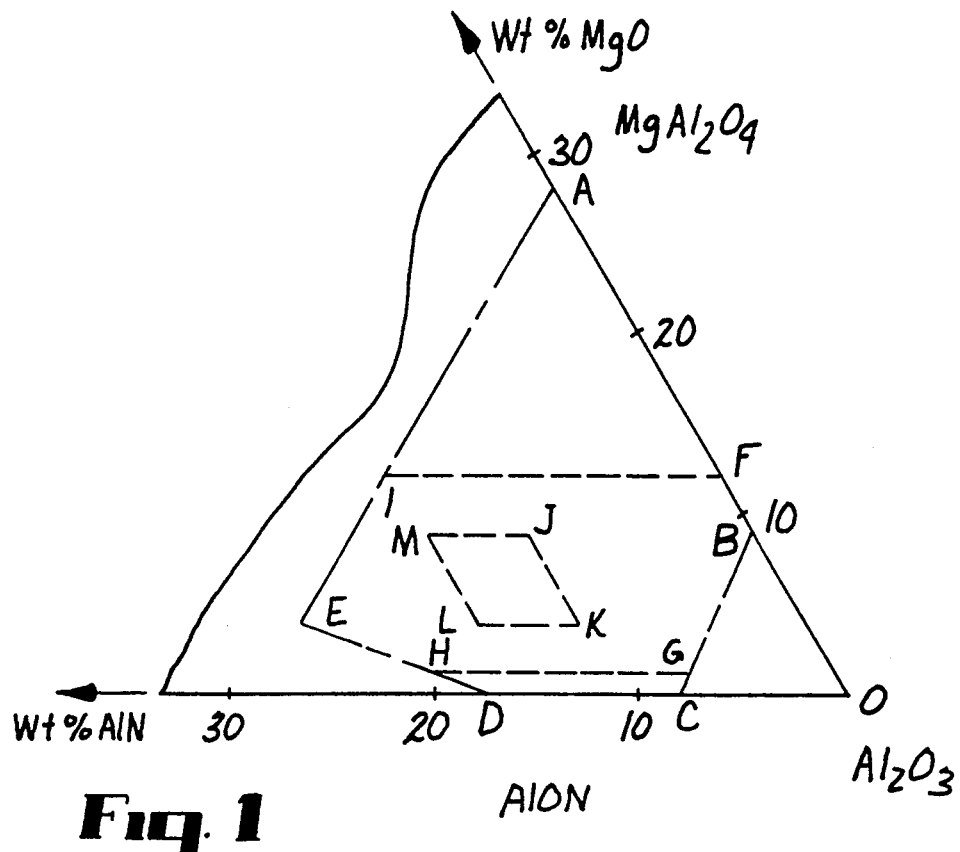
FIG. 1 represents a portion of an $Al_2O_3$-MgO-AlN phase diagram.

Referring to FIG. 1, which represents a portion of the $Al_2O_3$-MgO-AlN ternary phase diagram, the approximate solid solution range for MgO in AlON falls within the area or along the boundary defined by ABCDEA. The transparent aluminum magnesium oxynitride-based compositions of the present invention fall within the area or along the boundary defined by FBGHEIF. The composition of the most preferred aluminum magnesium oxynitride-based ceramics of the present invention fall within the area or along the boundary defined by JKLMJ.

The ceramic article of the present invention may be prepared using commercially available raw materials. The preferred raw materials are oxide and nitride powders which comprise less than 100 parts per million transition metal (e.g., Fe, Ti, Co, Ni, Cr, and Zr) based on the total weight of the oxide and nitride powders. The presence of such impurities may cause aluminum oxynitride-based ceramics sintered in a nitrogen atmosphere to exhibit an undesirable gray to brown tint. It is preferable that the AlN powder have a low residual carbon content (i.e., less than 0.1 weight percent based on the weight of the AlN powder).

Preferably the raw materials are $Al_2O_3$ (available from, for example, Union Carbide Corp.; Indianapolis, IN , AlN, (Tokuyama Soda Co.; Tokyo, Japan) MgO (Baikowski International; Charlotte, NC), and $MgAl_2O_4$ (TAM ceramics; Niagara Falls, NY) powders.

Raw materials used to prepare the ceramic article of the present invention preferably have a particle size of 5 micrometers or less, more preferably in the range of 0.01 to 5 micrometers, and most preferably in the range of 0.1 to 2 micrometers. Raw materials comprising aggregates of weakly bonded crystallites, however, may also be useful provided the crystallites comprising the aggregates are within the preferred size range and the bonds between the crystallites are sufficiently weak such that the aggregates may be reduced to the preferred size. Size reduction of the aggregates may be accomplished by conventional techniques including, for example, ball-milling.

The surface area of a powder is inversely related to the crystallite size. Preferably the oxide and nitride powders have a surface area in the range of 1 to 20 $m^2/g$. Powders with a surface area less than 1 $m^2/g$ tend to be difficult to reduce in size. Powders with a surface area greater than 20 $m^2/g$ tend to provide powder compacts with relatively high void volumes making it difficult to sufficiently eliminate pores during sintering.

The raw materials may be mixed by conventional techniques including, for example, ball-milling, attritor milling, vibratory-milling, high-shear mixing, and sonic dispersion. Useful processes include those capable of breaking down any aggregates, if present, to within the preferred size range. Care should be taken in mixing the raw materials to minimize contamination from milling media, mill jar, mixing blades, etc. Contaminants which may be detrimental to the preparation of the ceramic article of the present invention include, for example, transition metals or compounds thereof.

AlN powders and mixtures thereof should be protected from moisture pickup prior to heating or sintering. AlN may react with water to form ammonia and aluminum hydroxide. The loss of nitrogen in the form of ammonia gas may result in a final ceramic composition deficient in nitrogen.

Conventional organic binders, lubricants, etc., known to aid in the formation of a green article may be added to the powders, preferably in an amount up to 50 volume percent. Organic binders useful in preparing the green article of the present invention include, for example, polyethylene glycol. Organic lubricants include, for example, stearic acid.

In a preferred method, a ball mill is charged with the appropriate oxide and nitride powders, organic binder, mill media, and an organic solvent, such as for example, an alcohol (e.g., ethanol or methanol), ketone (e.g., acetone), trichloroethane, toluene, xylene, hexane, the like, or compatible combinations thereof. The preferred organic solvent is ethanol. Alternatively, the raw materials may be ball milled dry (i.e., no solvent is added to the ball mill).

The charge is milled for a time sufficient to thoroughly mix the raw materials and to adequately reduce the size of the particles/aggregates comprising the powder. Preferably, the milling time is not long enough to allow impurities from the mill media, mill jar, mixing blades, etc. to contaminate the slurry. Preferably, the charge is milled for a time period in the range of 0.5 to 24 hours. More preferably, milling time is about 6 hours. After milling, solvent, if present, may be evaporated by heating.

Conventional forming methods may be used to prepare a shaped, green article of the present invention including, for example, dry-pressing, slip-casting, tape casting, and extrusion.

If a green article is shaped by dry-pressing, a powder cake, which typically forms when the solvent is evaporated, may be reduced in size by any means known in the art, including, for example, by gently crushing it with a mortar and pestle and then screening, to provide agglomerates in a size range suitable for dry-pressing (i.e., less than 250 micrometers).

Preferably, the green article of the present invention is heated to a temperature and for a time sufficient to burn out organic substituents, if present, in the powder mixture. More preferably, the green article is slowly heated to a temperature in the range of 300° to 1000° C. for a time sufficient to burn out organic substituents, if present, in the powder mixture. The preferred heating rate is dependent on the atmosphere in which the article is heated and the amount and type of organic substituents which may be present. Preferably, the heating rate is slow enough to minimize or prevent cracking, bloating, or distortion of the article during removal of organic substituents.

Removal of organic substituents at up to 600° C. may take place in a air, nitrogen, or inert atmosphere or in a vacuum. Removal of organic substituents at temperatures above 600° C. preferably takes place in a nitrogen or inert atmosphere to prevent oxidation of the AlN. The selection of the burn-out atmosphere and temperature preferably is such that the amount of any residual carbon from organic substituents is not sufficient to cause the sintered article to be substantially discolored.

An important factor in determining the transparency of a sintered article is the number of pores. In general, the fewer the pores, the higher the transparency. Pores are formed during sintering when voids present in an unfired article, which contain furnace gas, are sealed off during the sintering process. As the sintering process progresses pores are removed via diffusion. To minimize the number of pores in a fired pure oxide ceramic e.g., alumina), it is usually necessary to fire either in a vacuum or hydrogen atmosphere. Although the diffusion rate of hydrogen through a ceramic oxide is significantly faster than the rate for any other gas, its flammability raises safety concerns. A vacuum furnace on the other hand is significantly more expensive than a furnace with a conventional firing atmosphere (e.g., nitrogen). Unlike pure oxide ceramics the transparent aluminum oxynitride-based ceramic of the present invention may be sintered in a nitrogen, or inert (e.g., He, Ar, etc.) atmosphere.

The preferred atmosphere for sintering the article of the present invention is nitrogen. Sintering in a nitrogen atmosphere tends to suppress volatilization of the nitrogen contained in an aluminum magnesium oxynitride ceramic or precursors thereof.

Volatilization of aluminum nitride and aluminum magnesium oxynitride may be further suppressed by packing the green article in a compatible powder or sand such as, for example, aluminum nitride, aluminum oxynitride, alumina, or combinations thereof. Preferably, the powder or sand comprises about 5 to 10 percent by weight of aluminum nitride (average particle size of 0.7 micrometer) and about 95 to 90 percent by weight of alumina (average particle size of 300–420 micrometers), or aluminum oxynitride (average particle size of 300–420 micrometers). Such sands or powders preferably have a low transition metal content (i.e., less than 100 parts per million by weight).

The preferred sintering temperature is in the range of 1600° to 2000° C., and more preferably in the range of 1950° to 2000° C. Preferably, the sintering time is in the range of 2 to 10 hours, and more preferably in the range of 4 to 6 hours.

In a more preferred process, the article is heated to and held at a temperature in the range of 1700° to 1800° C. for a time in the range of 0.5 to 1 hour prior to heating to a temperature in the range of 1950° to 2000° C.

The transparent ceramic of the present invention is useful in applications where it is desirable to have a transparent material including, for example, dental devices (e.g., orthodontic brackets), ferrules (e.g., the alignment pin of a fiber optic connector), and gas tight envelopes (e.g., high pressure sodium vapor discharge lamps). Other utilities of the ceramic article of the present invention include, radomes, and windows for infrared sensors, armor, chemical processing equipment, and high temperature ovens.

Figure 5:
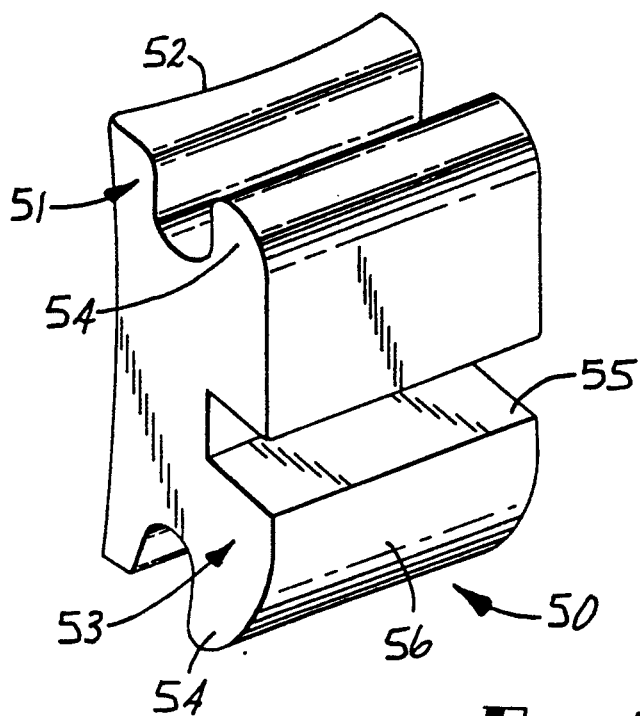
FIG. 5 illustrates a preferred orthodontic device according to the present invention.

A preferred dental device is orthodontic bracket 50 shown in FIG. 5. The bracket has base 51 suitable for either direct bonding to a tooth, or attachment to any kind of mounting fixture. Tooth-facing surface 52 of base 51 is preferably conventionally concavely curved about both a mesiodistal axis and an apical axis to match the natural convexity of the tooth's labial surface or lingual surface to allow direct attachment to at least a portion of the labial or lingual surface. Other curvatures can be used to accommodate labial or lingual bracket positioning.

Bracket body 53 extends from base 51 to define bracket tie wings 54 for ligature anchorage, and mesio-distally oriented arch-wire slot 55 extending from outer body surface 56 into the bracket body. Tie wings 54 may be of either a single or twin configuration (single configuration shown). Angulation of base 51 and arch-wire slot 55 may vary to take advantage of torquing and bending of the arch-wire to create tooth movement forces in the desired direction.

In another preferred embodiment, toothfacing surface 52 of base 51 is shaped to allow for attachment of a metal band to the orthodontic bracket, wherein the metal band encircles the perimeter of the tooth.

The term "orthodontic device" is herein used in a broad sense to include any device intended for mounting on a tooth, and used to transmit to the tooth corrective force from an arch-wire, spring, elastic, or other activatable force-applying component. Similarly, the term "arch-wire slot" is used broadly to designate any bracket structure which receives or couples with the force applying component. The term is thus intended to include such equivalent structures as a buccal tube which receives a facebow or similar device.

It is within the scope of this invention to include other useful orthodontic bracket configurations known in the art including those disclosed in U.S. Pat. Nos. 4,784,606 and 4,915,625, and assignee's co-pending patent application, U.S. Ser. No. 07/248,297, filed Sep. 21, 1988.

In a preferred method, the position of a tooth may be changed by the step of providing an orthodontic bracket, having a toothfacing surface and an archwire receiving slot therein, comprising the transparent aluminum oxynitride-based ceramic of the present invention; and securing the orthodontic bracket to a tooth and connecting an orthodontic archwire adjacent to the archwire receiving slot, wherein the orthodontic archwire provides sufficient force to move the tooth to a desired position over a period of time.

The orthodontic bracket according to the present invention may be secured to the tooth by techniques known in the art including, for example, banding or bonding. In a preferred method, the orthodontic bracket is secured to the tooth with a light curable adhesive resin, wherein the light curable resin is exposed to electromagnetic radiation, and wherein the electromagnetic radiation is transmitted through the orthodontic bracket in an amount sufficient to cure the resin. In a more preferred method, the surface of the tooth is cleaned with pumice, rinsed with water, dried, etched with 37% phosphoric acid (preferably for about 15 seconds), rinsed with water (preferably for at least 45 seconds), air dried, and coated with a dental primer (i.e., applying an uncured dental primer and then curing it), prior to putting the light curable resin in contact with the tooth surface.

Light curable resins which are useful for bonding the orthodontic bracket to a tooth are commercially available, and include, for example, TRANSBOND TM Light Cured Orthodontic Adhesive (3M Unitek Corp. of Monrovia, CA). Useful dental primers are commercially available, and include, for example, TRANSBOND TM Light Cured Orthodontic Primer (3M Unitek Corp.).

The fiber connector according to the present invention has a ferrule comprising the transparent ceramic of the present invention.

Figure 6:
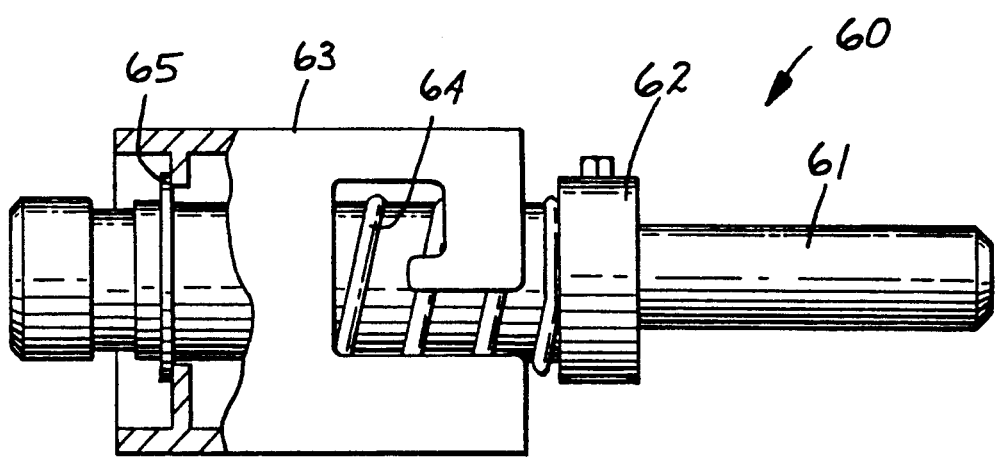
FIG. 6 illustrates a preferred fiber connector according to the present invention.

Preferred fiber connector 60, is shown in FIG. 6. Fiber connector 60 has ferrule 61 mounted inside backbone 62, housed in bayonet cap 63, wherein pressure is applied to bayonet cap 63 by spring 64, and wherein spring 64 is held by clip 65.

It is also within the scope of this invention to include other useful fiber connector configurations including, for example, those disclosed in U.S. Pat. Nos. 4,487,474 or 4,842,363.

A fiber comprised of glass (e.g., silica), plastic (e.g., polymethylmethacrylate), or the like, may be connected to a ferrule according to the present invention by techniques known in the art, including, for example, bonding with heat curable epoxy. Preferably, the fiber is bonded to the ferrule by a radiation curable resin, wherein the curable resin is exposed to electromagnetic radiation, and wherein the electromagnetic radiation is transmitted through the ferrule in an amount sufficient to cure the resin. The preferred radiation curable resin is a light curable resin. Light curable resins which are useful for bonding a fiber to the ferrule are commercially available, and include, for example, TRANSBOND TM Light Cure Orthodontic Adhesive (3M UNITEK Corp. , and SILUX TM Enamel Bond Resin (3M).

Objects and advantages of this invention are further illustrated by the following examples, but the particular materials and amounts thereof recited in these examples, as well as other conditions and details, should not be construed to unduly limit this invention. All parts and percentages given in the examples are by weight unless otherwise indicated.

All samples prepared in the Examples, unless specifically designated "Comparative" exhibit transparency as defined above.

EXAMPLE 1

Figure 2:
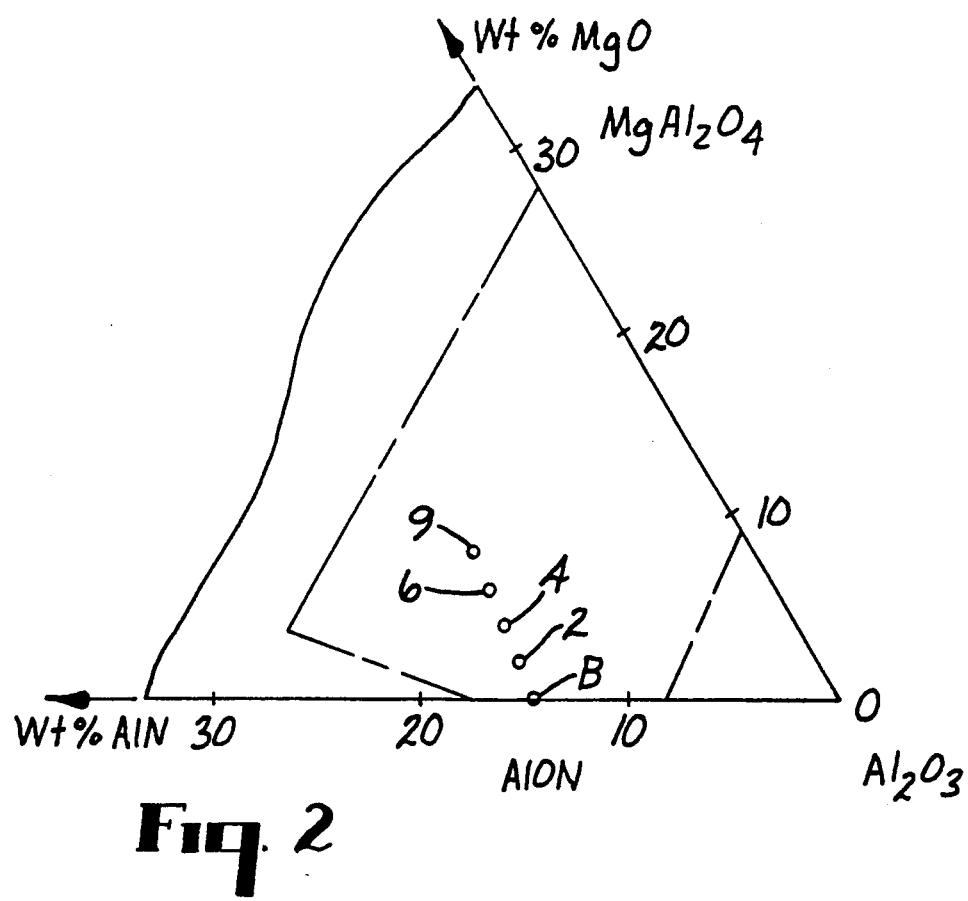
FIG. 2 illustrates the approximate compositions of Samples 2, 4, 6, and 9 and Comparative B of Example 1 within an $Al_2O_3$-MgO-AlN phase diagram.

Eleven samples of varying compositions as disclosed in Table 1 below were prepared using the procedures described below. The approximate location of each composition within an $Al_2O_3$-MgO-AlN phase diagram is illustrated in FIG. 2. To simplify FIG. 2 only one sample of a particular composition is designated, although other samples having the same composition would have the same location within the $Al_2O_3$-MgO-AlN phase diagram.

A one-liter porcelain mill jar (ROLEX TM Size 00; Norton Co.; Akron, OH) was charged with MgO (M120CR TM; Baikowski International Corp.; Charlotte, NC), AlN (Grade F; Tokuyama Soda Corp.; Tokyo, Japan), and $Al_2O_3$ (Linde TM A; Union Carbide Corp.; Indianapolis, IN) powders to provide 60 gram batches. Three grams of stearic acid, 3 grams of polyethylene glycol (molecular weight of about 4000), 166 grams of ethanol, and 1258 grams of high-alumina media (BURUNDRM TM rods, 6 mm long; Norton Co.) were also added to the jar. The contents of the jar were ball-milled for 24 hours at a speed of 60 rpm.

After milling, the resulting slurry was placed in a glass beaker and heated on a hot plate with stirring at 40° C. for a time sufficient to evaporate the ethanol. The dried slurry was then gently broken up with a mortar and pestle and passed through a 60 mesh sieve (U.S. Standard Series; Murdock, Inc.; Arlington Heights, IL).

About 0.5 grams of the minus 60 mesh powder of each sample was pressed into a disc 13 mm in diameter and about 2 mm thick at 140 MPa using a laboratory press (Carver Laboratory Press; Sterling, Inc.; Menomonie Falls, WI).

Organic substituents were burned out of the disc by heating in a conventional furnace according to the following schedule:

```
20 → 100° C. at 1.3° C./minute
100 → 200° C. at 0.4° C./minute
200 → 500° C. at 1.25° C./minute
500 → 600° C. at 1.7° C./minute
600° C. hold for 0.5 hours
600 → 20° C. in 2 hours.
```

The disc was then reaction-sintered in a covered boron nitride crucible (Grade HBN; Union Carbide Corp.; Cleveland, OH). The disc was surrounded with an aluminum oxynitride sand (particle size about 300–420 micrometers), prepared as disclosed in U.S. Pat. No. 4,788,167. The disc was heated in a nitrogen atmosphere using a graphite element resistance furnace according to the following schedule:

```
20 → 1000° C. in 15 minutes
1000 → 1950° C. at 25° C./minute
1950° C. held for 1, 5, or 10 hours
1950 → 20° C. in 2 hours.
```

The flat surfaces of the disc were ground using a conventional 15 micrometer metal bonded diamond abrasive disc to provide a thickness of 1.25+0.05 millimeters. The ground surfaces were polished with 1 micrometer alumina followed by a final polishing with 0.3 micrometer alumina.

A Model TR 927 Densitometer (Macbeth; Newburgh, NY) was used to measure the "optical density", D, of each disc. The optical density values were converted into percent diffuse transmission values using the equation, $$D = \log \frac{1}{T} ; \text{ and}$$

and are in Table 1, below.

TABLE 1

| Sample | Composition | | | Hours held at 1950° C. | Thickness of pressed disc, mm | Thickness of disc after polishing, mm | Percent diffuse transmission, T |
|---|---|---|---|---|---|---|---|
| | MgO | AlN | $Al_2O_3$ | | | | |
| Comparative A | 0.0 | 14.7 | 85.3 | 1 | 2 | 1.25 | 23 |
| Comparative B | 0.0 | 14.7 | 85.3 | 5 | 2 | 1.25 | 23 |
| 1 | 2.0 | 14.4 | 83.6 | 1 | 2 | 1.25 | 26 |
| 2 | 2.0 | 14.4 | 83.6 | 5 | 2 | 1.25 | 27 |
| 3 | 4.0 | 14.1 | 81.9 | 1 | 2 | 1.25 | 43 |
| 4 | 4.0 | 14.1 | 81.9 | 5 | 2 | 1.25 | 29 |
| 5 | 6.0 | 13.8 | 80.2 | 1 | 2 | 1.25 | 26 |
| 6 | 6.0 | 13.8 | 80.2 | 5 | 2 | 1.25 | 62 |
| 7 | 6.0 | 13.8 | 80.2 | 10 | 2 | 1.25 | 59 |
| 8 | 8.0 | 13.5 | 78.5 | 1 | 2 | 1.25 | 17 |

TABLE 1-continued

| Sample | Composition | | | Hours held at 1950° C. | Thickness of pressed disc, mm | Thickness of disc after polishing, mm | Percent diffuse transmission, T |
|---|---|---|---|---|---|---|---|
| | MgO | AlN | Al$_2$O$_3$ | | | | |
| 9 | 8.0 | 13.5 | 78.5 | 5 | 2 | 1.25 | 53 |

The data of Table 1 show the poor transmission of samples fired at 1950° C. for 1 hour. The samples comprising up to 6 percent magnesium oxide, however, exhibited an increase in transmission when fired at 1950° C. for 5 hours. The best transmission was 62% (Sample 6). Further heating of the formulation 6 percent magnesium oxide at 1950° C. for up to 10 hours (Sample 7) did not significantly improve the level of transmission. All samples were colorless, with the exception of Samples 8 and 9, which were gray.

The optical clarity of the samples fired at 1950° C. for 5 hours corresponded well to the diffuse transmission values (i.e. high transmission values mean high optical clarity). For example, a printed page of text (i.e. black type on white paper) placed under Comparative B could not be read. The text, however, was clearly visible beneath all samples comprising magnesium oxide fired at 1950° C. for 5 or more hours. The best visibility, was provided by Samples 6 and 7, which both comprised 6 percent magnesium oxide.

Comparatives A and B and Samples 5, 6, and 7 were polished and then etched with phosphoric acid at 170° C. for 1 hour, to reveal their respective microstructures. The grain size associated with each microstructure was determined by the line intercept method described by Mendelson in "Average Grain Size in Polycrystalline Ceramics", *J. Am. Cer. Soc.*, 52, (8), 1969, pp. 443–46. The average grain sizes as determined by this method are given in Table 2 below.

TABLE 2

| Sample | Percent MgO | Time held at 1950° C., hrs. | Average grain size, micrometers |
|---|---|---|---|
| Comparative A | 0 | 1 | 30 |
| Comparative B | 0 | 5 | 60 |
| 5 | 6 | 1 | 40 |
| 6 | 6 | 5 | 95 |
| 7 | 6 | 10 | 115 |

The grain size distributions satisfied the criterion for normal grain growth (i.e., the maximum grain size of each microstructure was less than 2.5 times the average grain size).

Furthermore, there were numerous clusters of small pores (i.e., less than 1 micrometer in diameter) scattered throughout the microstructure of Comparative A. The frequency of these clusters decreased as the firing time at 1950° C. was increased from 1 hour to 5 hours. Clusters of pores were also present in Sample 5. Sample 6, fired for 5 hours at 1950° C., however, was nearly pore free (i.e., there were only a few scattered pores observed).

Conventional x-ray diffraction techniques were used to determine that the crystalline phase present in Comparative B was AlON. Sample 6 exhibited an x-ray diffraction pattern which was indistinguishable from the pattern for AlON, except for a slight shift in the peak locations presumably caused by a change in the lattice parameters of the crystal structure. No free (i.e., unreacted) magnesium oxide was detected in Sample 6.

EXAMPLE 2

In this example, Samples 10 and 11 were prepared in the same manner as Sample 6 except the thickness of the pressed discs were about 4 millimeters and about 6 millimeters, respectively.

Samples 10 and 11 were significantly less transparent than Sample 6. The lower transparency is believed to be due to the higher level of residual porosity present and a slight gray discolorization of the interior of Samples 10 and 11.

A circular slice through the center of Sample 11 was examined in a scanning microscope (SEM) equipped with x-ray microanalysis (XRMA).

Four regions of the center slice were examined:
(1) the outer edge;
(2) the outer region (about 0.8 to 1 mm from the edge);
(3) the inner region (about 1 to 1.2 mm from the edge) and;
(4) the center.

The only elements detected were aluminum and magnesium. Oxygen and nitrogen were not detected because their atomic numbers, which are below 12, are outside the detectable range of the instrument. The magnesium oxide levels determined for each region are listed in Table 3 below.

TABLE 3

| Region of center slice of Sample 11 | Color | Percent MgO |
|---|---|---|
| Outer Edge | None | 3.6 |
| Outer Region | None | 5.5 |
| Inner Region | Slight Gray | 5.9 |
| Center | Slight Gray | 5.5 |

These data show at least a portion of the magnesium oxide volatilized during firing, particularly at the outer edge of the sample. The loss of magnesium oxide, however, does not appear to be related to the slight gray color observed in some regions of the sample. The amount of magnesium oxide determined to be present in the selected regions of Sample 11 do not correspond to the color observed in each of the regions.

EXAMPLE 3

A one-liter porcelain mill jar was charged with 21.2 grams of MgAl$_2$O$_4$ (CERNEL ™ 1; TAM Ceramics; Niagara Falls, NY), 13.8 grams of AlN, and 65.0 grams of Al$_2$O$_3$ powders, 128 grams of ethanol, and 1250 grams of high-alumina media. The jar was rotated at 60 rpm. About grams of the slurry were removed from the jar after milling intervals of 0.5, 1, 2, 4, 6, and 24 hours. (See Table 4, below.)

TABLE 4

| Sample | Milling time, hours | Composition | | | Thickness of pressed disc, mm |
|---|---|---|---|---|---|
| | | MgO | AlN | Al$_2$O$_3$ | |
| 12 | 0.5 | 6.0 | 13.8 | 80.2 | 4 |
| 13 | 1 | 6.0 | 13.8 | 80.2 | 4 |
| 14 | 2 | 6.0 | 13.8 | 80.2 | 4 |

TABLE 4-continued

| Sample | Milling time, hours | Composition | | | Thickness of pressed disc, mm |
|---|---|---|---|---|---|
| | | MgO | AlN | $Al_2O_3$ | |
| 15 | 4 | 6.0 | 13.8 | 80.2 | 4 |
| 16 | 6 | 6.0 | 13.8 | 80.2 | 4 |
| 17 | 24 | 6.0 | 13.8 | 80.2 | 4 |

The 5 grams of slurry were dried prior to mixing with 0.25 grams of stearic acid and 0.25 grams of polyethylene glycol (molecular weight of about 4000) in about 10 grams of methanol. The methanol was subsequently evaporated by heating.

The dried powder was broken up, screened, and pressed into discs as described in Example 1, except 4 mm thick discs were pressed from 1 gram of the powder.

Organic substituents were burned out of the disc according to the following heating schedule:

```
20 → 45° C. at 0.8° C./minute
45 → 60° C. at 0.04° C./minute
60 → 160° C. at 0.17° C./minute
160° C held for 5 hours
160 → 180° C. at 0.03° C./minute
180 → 220° C. at 0.17° C./minute
220 → 330° C. at 0.3° C./minute
330° C held for 2 hours
330 → 20° C. at 1.7° C./minute.
```

The discs were reaction-sintered as described in Example 1, except the discs were surrounded by a blend of sand/powder comprising 90 weight percent alumina sand (T-64 Tabular Alumina; ALCOA) and 10 weight percent aluminum nitride powder (Grade F; Tokuyama Soda Co.) and was heated according to the following schedule:

```
20 → 1000° C. in 15 minutes
1000 → 1975° C. at 25° C./minute
1975° C. held for 5 hours
1975 → 20° C. in 2 hours.
```

Samples 12, 13, and 14 which were milled for 2 hours or less, were white and nearly opaque. Samples 15, 16, and 17 which were milled for 4 hours or more, were translucent, but became progressively more gray in color with increasing mill time. Sample 16, which was milled for 6 hours, provided the best compromise between the desired high transparency and an undesired grey coloration.

The increase in discoloration with increasing mill time is believed to be due to transition metal impurities from the milling media. The absence of this discolorization in thinner discs (i.e., 2 mm thick or less) and in the surfaces of the thicker discs (i.e., greater than 2 mm thick) suggests these impurities may volatilize during firing to some extent.

EXAMPLE 4

Figure 3:
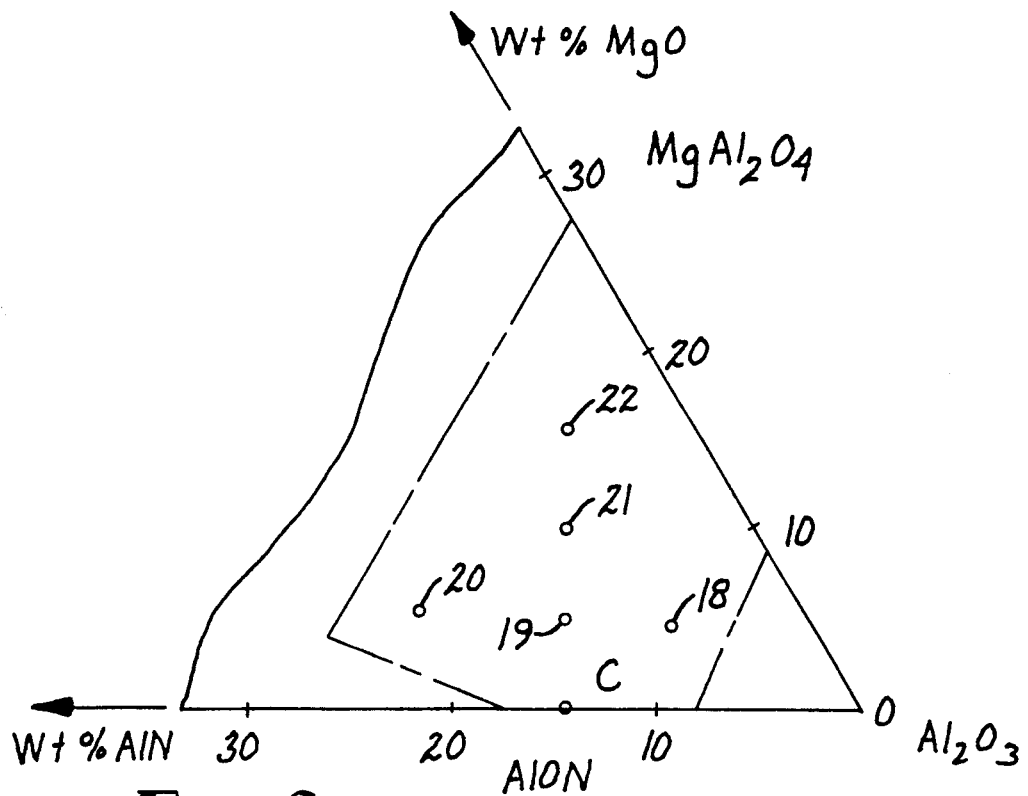
FIG. 3 illustrates the approximate compositions of Samples 18, 19, 20, 21, and 22 and Comparative C of Example 4 within an $Al_2O_3$-MgO-AlN phase diagram.

The approximate compositions of Samples 18, 19, 20, 21, and 22 and Comparative C of Example 4 within an $Al_2O_3$-MgO-AlN phase diagram, are illustrated in FIG. 3.

A one liter porcelain mill jar was charged with $MgAl_2O_4$, AlN, and $Al_2O_3$ powders to provide 60 gram batches of the compositions given in Table 5. Three grams of polyethylene glycol (molecular weight of about 200), 1200 grams of high alumina media, and 166 grams of ethanol were also added to the jar. The jar was rotated at 60 rpm for 6 hours. The slurry of each composition was dried, screened, and pressed into a disc as described in Example 1.

The organic substituent was burned out of the pressed discs by heating according to the following schedule:

```
20 → 600° C. at 3° C./minute
600° C. hold for 0.5 hours
600 → 20° C. at 3° C./minute.
```

The disc was then reaction-sintered as described in Example 3.

The flat surfaces of each disc were ground and polished as described in Example 1. The optical density of each sample was measured using the densitometer as described in Example 1. The results are reported below as percent transmission in Table 5.

TABLE 5

| Sample | Composition | | | Thickness of pressed disc, mm | Thickness of polished disc, mm | Percent diffuse transmission, T |
|---|---|---|---|---|---|---|
| | MgO | AlN | $Al_2O_3$ | | | |
| Comparative C | 0.0 | 14.7 | 85.3 | 2 | 1.25 | 27 |
| 18 | 4.6 | 7.1 | 88.3 | 2. | 1.25 | 66 |
| 19 | 5.0 | 12.1 | 82.9 | 2. | 1.25 | 72 |
| 20 | 5.4 | 19.3 | 75.3 | 2. | 1.25 | 36 |
| 21 | 10.2 | 9.4 | 80.4 | 2. | 1.25 | 55 |
| 22 | 15.9 | 6.5 | 77.6 | 2. | 1.25 | 36 |

The data show there was substantial improvement in transmission with up to 12 percent magnesium oxide present, provided the aluminum nitride content was in the range of 5 to 18 percent.

EXAMPLE 5

Figure 4:
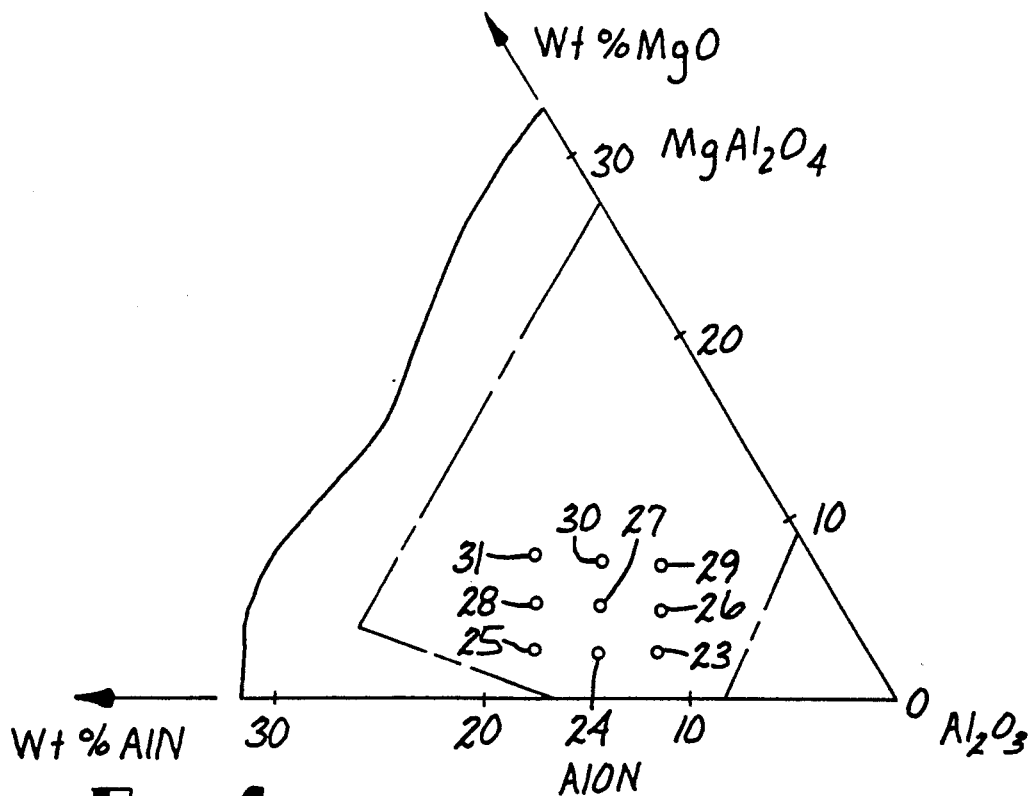
FIG. 4 illustrates the approximate compositions of Samples 23, 24, 25, 26, 27, 28, 29, 30, and 31 of Example 5 within an $Al_2O_3$-MgO-AlN phase diagram.

The approximate compositions of Samples 23, 24, 25, 26, 27, 28, 29, 30, and 31 of Example 5 within an $Al_2O_3$-MgO-AlN phase diagram, are illustrated in FIG. 4.

A one liter high density polyethylene mill jar (Nalge Co.; Rochester, NY) was charged wit $MgAl_2O_4$, AlN, and $Al_2O_3$ powders to provide 125 gram batches of the compositions given in Table 6 (below), 1200 grams of high-alumina media, 128 grams of ethanol, and 6.25 grams of polyethylene glycol (molecular weight is 200). The jar was rotated at 96 rpm for 12 hours. The slurry of each sample was dried, screened, and pressed into discs as described in Example 4.

TABLE 6

| Sample | Composition | | | Pressed thickness of disc, mm | Thickness of polished discs, mm | Percent diffuse transmission, T |
|---|---|---|---|---|---|---|
| | MgO | AlN | Al$_2$O$_3$ | | | |
| 23 | 2.4 | 10.5 | 87.1 | 4 | 3.0 | 29 |
| 24 | 2.5 | 13.4 | 84.1 | 4 | 3.0 | 19 |
| 25 | 2.5 | 16.5 | 81.0 | 4 | 3.0 | 15 |
| 26 | 4.8 | 9.2 | 86.0 | 4 | 3.0 | 30 |
| 27 | 5.0 | 12.1 | 82.9 | 4 | 3.0 | 65 |
| 28 | 5.2 | 15.2 | 79.6 | 4 | 3.0 | 50 |
| 29 | 7.3 | 7.9 | 84.8 | 4 | 3.0 | 43 |
| 30 | 7.5 | 10.8 | 81.7 | 4 | 3.0 | 42 |
| 31 | 7.8 | 13.9 | 78.3 | 4 | 3.0 | 63 |

Organic substituents were burned out of the discs by heating according to the following schedule:

```
20 → 600° C. at 3° C./minute
600° C. hold for 0.5 hours
600 → 20° C. at 10° C./minute.
```

The discs were then reaction sintered as described in Example 1, except they were surrounded by a blend comprising 90% AlON sand (prepared as described in Example 1) and 10% AlN powder (as described in Example 3) and were heated according to the following schedule:

```
20 to 1000° C. in 15 minutes
1000 → 1800° C. at 25° C./minute
1800° C. hold for 0.5 hours
1800 → 1975° C. at 25° C./minute
1975° C. hold for 5 hours
1975 → 20° C. in 2 hours.
```

The flat surfaces of the each disc were ground and polished as described in Example 1 to provide 3.00±0.05 millimeter thick discs. The optical density was measured as described in Example 1 using the densitometer and is reported as percent diffuse transmission in Table 6. The data show there is a substantial improvement in transparency with the presence of magnesium oxide in the range of 4 to 9 percent provided the aluminum nitride content is in the range of 11 to 16 percent.

EXAMPLE 6

A sample was prepared in a manner similar to Sample 27 of Example 5 except 0.5 grams of the screened, dry slurry was pressed to provide a disc 2 mm thick. The flat surfaces of the disc were ground and polished as described in Example 1 to a thickness of 1.00 mm±0.05 mm.

Figure 7:
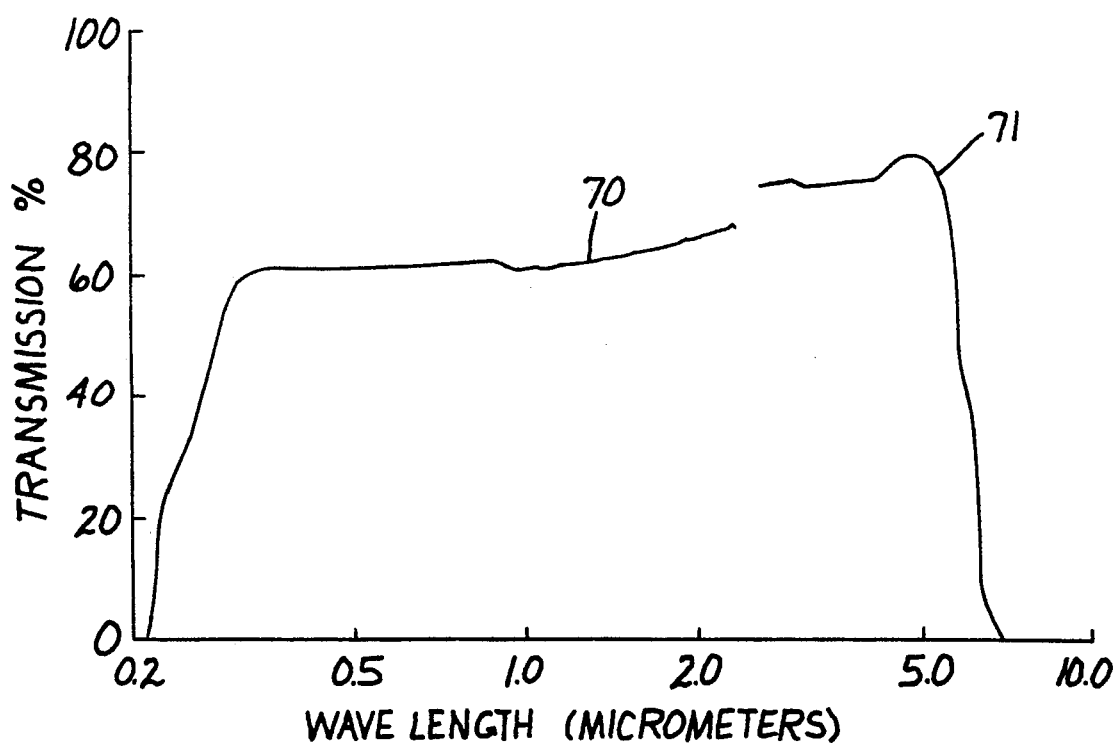
FIG. 7 refers to the in-line transmission of Example 6, wherein the wavelength of the electromagnetic radiation is in the range of 0.2 to 10.0 micrometers.

A Lambda Nine spectrometer (Perkin-Elmer Co.; Norwalk, CT) was used to measure the in-line transmission of Example 6 in the 0.2 to 2.4 micrometer wavelength range. A partial mask was used to minimize the presence of extraneous light within the sample holder. A background correction was done with the mask in place. The instrument settings were as follows:

Mode=Transmission, Scale=0 to 100%, Scan speed=0.96 micrometer/min., Response=0.5 sec., Slit=0.002 micrometer, Reference=Air, Sens=2, Peak Threshold=2%T, and Lamp/Det=0.3192/0.8608 micrometer. The data are represented by line 70 of FIG. 7, where the percent in-line transmission is plotted as a function of wavelength.

A Model 983 spectrometer (Perkin-Elmer Co.) was used to measure the transmission of Example 6 in the 2.5 to 10.0 micrometer wavelength range. The in-line transmission values are based on 100% transmission for the sample holder when empty. The data are represented by line 71 of FIG. 7.

The difference in the in-line transmission values for wavelengths of about 2.5 micrometers is due to characteristic differences in the two instruments used to obtain the percent in-line transmission values.

The data show the in-line transmission of the Example 6 material was greater than about 60% for wavelengths in the visible range (i.e., 0.40 to 0.70 micrometers). The in-line transmission for wavelengths in the 0.3 to 6 micrometer range were greater than about 40%.

EXAMPLE 7

A disc prepared according to the description of Sample 27 of Example 5 was bonded to a glass microscope slide using a light curable resin (commercially available under the trade designation "SILUX ENAMEL BOND RESIN" from 3M Company of St Paul, MN) according to the following procedure.

A piece of black electrical tape (about 5 cm by about 2 cm) having a 0.63 cm diameter hole was placed onto one flat surface of the Sample disc. One drop of the light curable resin was placed on a flat surface of the glass microscope slide. The flat surface of the disc opposite the electrical tape was gently pressed into the light curable resin.

The light curable resin was cured using a hand held curing unit (commercially available under the trade designation "VISILUX 2" from 3M Company of St. Paul, MN). The output of the light source was directed through the circular hole in the electrical tape. The resin was irradiated through the disc for about 10 seconds, which was sufficient to cure the resin.

Various modifications and alterations of this invention will become apparent to those skilled in the art without departing from the scope and spirit of this invention, and it should be understood that this invention is not to be unduly limited to the illustrative embodiments set forth herein.

We claim:

1. A transparent ceramic article consisting essentially of aluminum magnesium oxynitride, said aluminum magnesium oxynitride being a solid solution of alumina, magnesium oxide, and aluminum nitride, wherein greater than 0.5 weight percent of said solid solution of said aluminum magnesium oxynitride is magnesium oxide.

2. The article according to claim 1 wherein said article is colorless.

3. The article according to claim 1 wherein said magnesium oxide is present in the range of 1 to 12 weight percent, and wherein AlN is present in the range of 3 to 24 weight percent, based on said aluminum magnesium oxynitride solid solution.

4. The article according to claim 1 wherein said magnesium oxide is present in the range of 4 to 9 weight percent, and wherein AlN is present in the range of 11 to 16 weight percent, based on said aluminum magnesium oxynitride solid solution.

5. The article according to claim 1 wherein said article further comprises more than zero and less than 2 volume percent voids, based on the total volume of said article.

6. The article according to claim 1 wherein said article is essentially free of voids.

7. The article according to claim 1 which is a gas tight envelope.

8. The article according to claim 1 which is a dental device.

9. The article according to claim 8 wherein said dental device is an orthodontic bracket.

10. The article according to claim 1 which is a ferrule.

11. The article according to claim 1 wherein said aluminum magnesium oxynitride has a composition within the boundary defined by I, F, B, G, H, and E and along the boundary lines I-F, F-B, B-G, G-H, H-E, and E-I of FIG. 1 of the accompanying drawing.

12. The article according to claim 1 wherein said aluminum magnesium oxynitride has a composition within the boundary defined by J, K, L, and M and along the boundary lines J-K, K-L, L-M, and M-J of FIG. 1 of the accompanying drawing.

13. The article according to claim 1 wherein said article is free of transition metals and carbon in an amount sufficient to interfere with said transparency.

* * * * *

UNITED STATES PATENT AND TRADEMARK OFFICE
CERTIFICATE OF CORRECTION

PATENT NO. : 5,231,062
DATED : July 27, 1993
INVENTOR(S) : James P. Mathers and Robert G. Frey It is certified that error appears in the above-indentified patent and that said Letters Patent is hereby corrected as shown below:

Column 1, line 46, "Yamaguchi et. al." should read --Yamaguchi et al.--.

Column 7, line 9, "e.g., alumina)" should read --(e.g., alumina)--.

Column 9, line 24, "UNITEK Corp." should read --UNITEK Corp.)--.

Column 9, line 56, "BURUNDRM" should read --BURUNDUM--.

Column 10, line 42, "1.25+0.05" should read --1.25±0.05--.

Column 10, Table 1, under the column headed Percent diffuse transmission, T, "23, 23, 26, 27, 43, 29, 26, 62, 59, 17" should read --23, 26, 27, 43, 29, 49, 26, 62, 59, 17--.

Column 12, line 59, "About grams" should read --About 5 grams--.

UNITED STATES PATENT AND TRADEMARK OFFICE
CERTIFICATE OF CORRECTION

PATENT NO. : 5,231,062
DATED : July 27, 1993
INVENTOR(S) : James P. Mathers, et al It is certified that error appears in the above-indentified patent and that said Letters Patent is hereby corrected as shown below:

Column 14, line 61, "wit" should read —with—.

Signed and Sealed this

Eighteenth Day of July, 1995

Attest:

BRUCE LEHMAN

Attesting Officer

Commissioner of Patents and Trademarks